US007951223B2

(12) United States Patent
Nagai et al.

(10) Patent No.: US 7,951,223 B2
(45) Date of Patent: May 31, 2011

(54) METHOD OF SEPARATING RHODIUM FROM PLATINUM AND/OR PALLADIUM

(75) Inventors: Hifumi Nagai, Oita (JP); Yuji Kawano, Oita (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 12/487,931

(22) Filed: Jun. 19, 2009

(65) Prior Publication Data

US 2010/0180730 A1     Jul. 22, 2010

(30) Foreign Application Priority Data

Sep. 29, 2008 (JP) ................................ 2008-249448

(51) Int. Cl.
*C22B 3/06* (2006.01)
*C22B 3/22* (2006.01)
(52) U.S. Cl. .......................................... 75/426; 423/22
(58) Field of Classification Search ............ 75/419–426; 423/22
See application file for complete search history.

(56) References Cited

U.S. PATENT DOCUMENTS 4,960,573 A * 10/1990 Okutani et al. ................. 423/22

FOREIGN PATENT DOCUMENTS

| EP | 1577408 A1 | 9/2005 |
|---|---|---|
| GB | 2214173 A | 8/1989 |
| JP | 5-125461 A | 5/1993 |
| JP | 2003-268457 A | 9/2003 |
| JP | 2004-332041 A | 11/2004 |
| JP | 2004332041 A * | 11/2004 |
| JP | 2005-240170 A | 9/2005 |
| JP | 2007-154250 A | 6/2007 |
| JP | 2007154250 A * | 6/2007 |

OTHER PUBLICATIONS

Machine translation of JP 2004-332041 A published Nov. 2004.*
Machine translation of JP 2007-154250 A published Jun. 2007.*
European Search Report mailed Jan. 19, 2010 in corresponding European Application No. 09162810.7.
Toraiwa et al., "Development of Hydrometallurgical Process of Copper Anode Slimes in Nippon Mining & Metals", Journal of the Mining and Materials Processing Institute of Japan, vol. 116, pp. 484-492 (2000).

* cited by examiner

*Primary Examiner* — George Wyszomierski
*Assistant Examiner* — Tima M McGuthry-Banks
(74) *Attorney, Agent, or Firm* — Birch, Stewart, Kolasch & Birch, LLP

(57) ABSTRACT

A method of separating rhodium from platinum and/or palladium includes; chloridizing a raw material including rhodium and at least platinum and/or palladium in chlorine atmosphere and obtaining a soluble salt of platinum and/or palladium; water-leaching chloridized material and dissolving platinum and/or palladium into a solution; filtering the solution; and leaving rhodium in a filtered residue of the solution.

4 Claims, 1 Drawing Sheet

METHOD OF SEPARATING RHODIUM FROM PLATINUM AND/OR PALLADIUM

BACKGROUND OF THE INVENTION

1. Field of the Invention

The present invention relates a method of separating rhodium from platinum and/or palladium of raw material including rhodium and at least platinum and/or palladium.

2. Description of the Related Art

Platinum group metal such as rhodium, platinum or palladium is included in a residue collected by distilling selenium from copper-electrolyzed deposition (hereinafter referred to as selenium-distilled residue) or a residue obtained by treating scrap such as an automotive exhaust catalyst including platinum group metal such as rhodium, platinum or palladium (hereinafter referred to as rhodium-treated slag). Japanese Patent Application Publication No. 2004-332041 discloses a method including steps of adding sodium bromate to a solution including platinum group metal, oxidizing ruthenium to $RuO_4$, separating $RuO_4$ by distillation, hydrochloridizing the solution, separating palladium by a solvent extraction with di-n-hexyl sulfide (DHS) and separating platinum and iridium by a solvent extraction with tributylphosphate (IBP) in order, as a method of refining and collecting rhodium, platinum and palladium from the solution.

The platinum group metal such as rhodium, platinum or palladium is poorly soluble in a mineral acid under a normal condition. Aqua regia or a mixed liquid of strong oxidant and hydrochloric acid may dissolve platinum and palladium but may not dissolve rhodium. When a material including rhodium, platinum and palladium is dissolved in the aqua regia or the mixed liquid of strong oxidant and hydrochloric acid, the platinum and the palladium exposed in the acid may be dissolved but the rhodium may not be dissolved into the acid. Therefore, the platinum and the palladium covered with the undissolved rhodium may not be dissolved. It is therefore difficult to effectively collect rhodium, platinum and palladium from the mixed material including rhodium, platinum and palladium.

Japanese Patent Application Publication No. 2003-268457 discloses a method including steps of adding sodium hydrate and sodium nitrate to a solution including platinum group metal, leaching selenium and tellurium with water after melting, adding hydrogen peroxide and hydrochloride acid to a residue including platinum group metal, and dissolving the platinum group metal, as a method of dissolving the platinum group metal such as selenium, tellurium, rhodium, platinum or palladium. Japanese Patent Application Publication No. 2005-240170 discloses a method including steps of removing selenium and tellurium by chloridizing and vaporizing in a chlorine gas atmosphere, adding sodium chloride, obtaining soluble salt by chloridizing and roasting the platinum group metal, and dissolving the platinum group metal by water-leaching, as the method of dissolving the platinum group metal such as selenium, tellurium, rhodium, platinum or palladium. However, in the methods, rhodium, platinum and palladium are mixed in an aqueous solution. Solvent extraction of highly concentrated rhodium, platinum and palladium may cause mutual contamination. This may degrade separation efficiency. Therefore, repetition of the solvent extraction causes high cost. It is therefore preferable that rhodium, platinum and palladium are separated from each other with a simple method before dissolving these metals into an aqueous solution in order to collect these metals efficiently.

SUMMARY OF THE INVENTION

The present invention has been made in view of the above circumstances and provides a method of separating rhodium from platinum and/or palladium of raw material including rhodium and at least platinum and/or palladium.

According to an aspect of the present invention, there is provided a method of separating rhodium from platinum and/or palladium including: chloridizing a raw material including rhodium and at least platinum and/or palladium in chlorine atmosphere and obtaining a soluble salt of platinum and/or palladium; water-leaching chloridized material and dissolving platinum and/or palladium into a solution; filtering the solution; and leaving rhodium in a filtered residue of the solution.

The method may further include: crushing the raw material including rhodium and at least platinum and/or palladium into particles having grain diameter of 500 μm or smaller; and mixing carbon particle with the crushed raw material.

The raw material may be chloridized at 750 to 880 degrees C.

The method may further include: mixing sodium chloride with the rhodium separated from the platinum and/or palladium; chloridizing the rhodium in chlorine atmosphere and obtaining a soluble salt of rhodium; water-leaching the rhodium and dissolving the rhodium into a solution; filtering the solution; adding sodium bromate to the solution and separating ruthenium from the solution by oxidizing and distilling; and separating palladium, platinum and iridium in order with solvent extraction method.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
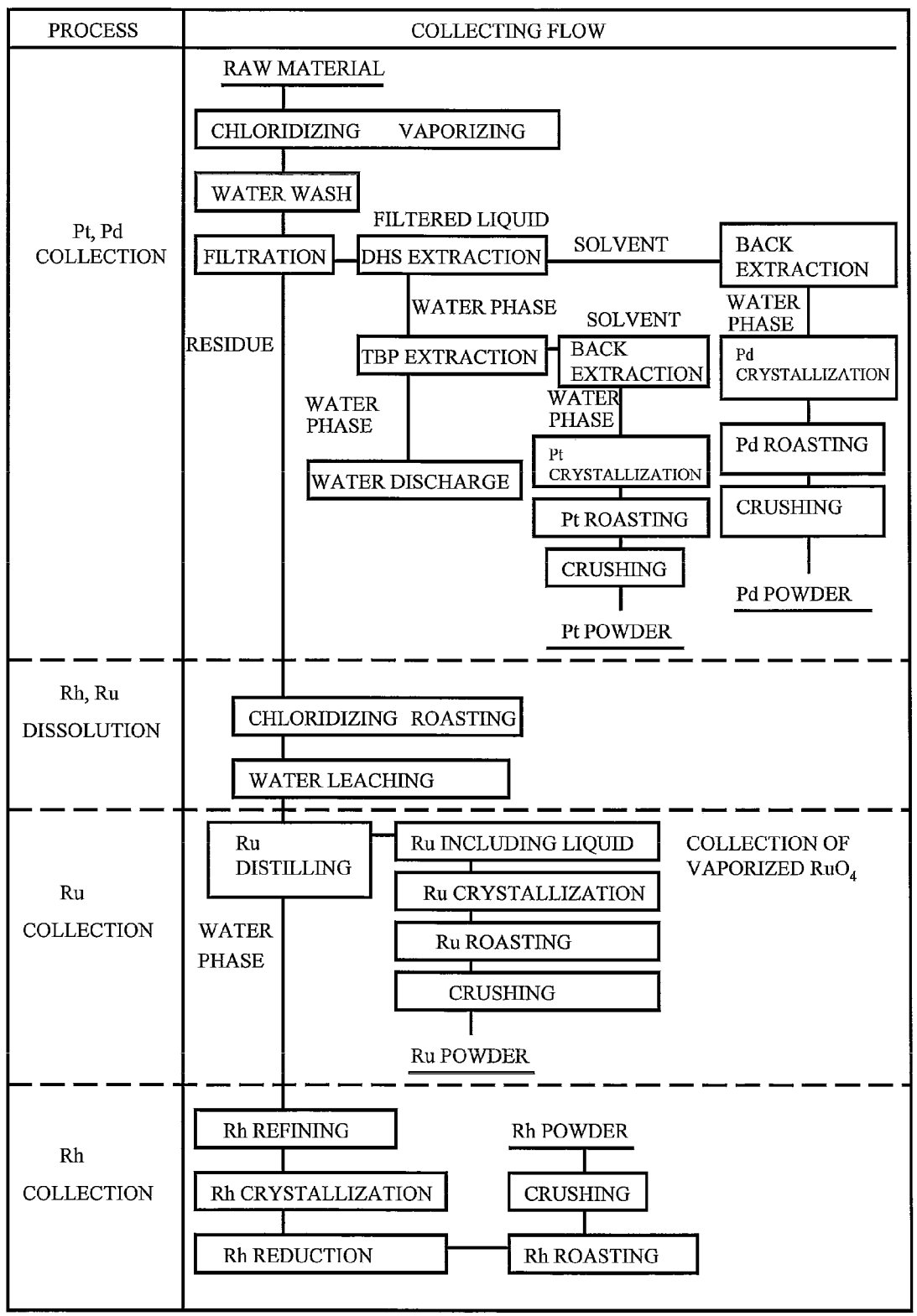
FIG. 1 illustrates a treatment flow sheet in accordance with an embodiment of the present invention.

A processing object of this embodiment is a powder including relatively highly concentrated rhodium, platinum and palladium. The object is, for example, selenium-distilled residue generated in a process of distilling and collecting selenium from deposition of copper-electrolytic-refining, or rhodium-treated slag generated in a process of treating a scrap including platinum group metal such as rhodium, platinum or palladium like automotive exhaust catalyst.

It is possible to treat powder having a diameter of 500 μm or smaller such as dried deposition of copper-electrolytic-refining after distilling selenium without any treatment. A raw material including block object such as rhodium-treated slag partially melted in a process of collecting noble metal is crushed into 500 μm or smaller size particles with use of a crusher or a hammer mill in advance.

If the raw material includes a lot of water, the raw material may release water vapor when the raw material is heated in chlorine gas stream. In this case, partial pressure of chlorine may be reduced temporarily, and oxide may be produced. It is therefore preferable that the raw material is dried adequately in advance. The drying condition is not limited. For example, the drying temperature is 100 degrees C. to 120 degrees C., and the drying time is 6 to 15 hours. The drying process may be omitted if the raw material includes little water.

The platinum group metal is difficult to be oxidized. However, an oxide layer may be formed on a surface of the platinum group metal. Chloride is not formed from the raw material in a next process of chloridizing treatment if an oxide of rhodium, platinum or palladium in the raw material is formed or rhodium, platinum or palladium in the raw material is oxidized with residual oxygen in an atmosphere. The oxide of rhodium, platinum or palladium is reduced into a metal and is chloridized when carbon particle is mixed into the crushed and dried raw material. The amount of the carbon particle may be determined according to oxidizing condition of the raw material or oxygen amount of the atmosphere gas. It is therefore not possible to determine the amount of the carbon particle. However, it is preferable that an equivalent amount of the carbon particle is twice to four times of a reduction reaction equivalent amount.

Rhodium chloride $RhCl_3$, platinum chloride $PtCl_4$, and palladium chloride $PdCl_3$ are generated when the carbon-mixed material including rhodium, platinum and palladium are heated in the chlorine gas stream. A preferable heating temperature is 750 degrees C. to 880 degrees C., and more preferable temperature is 780 degrees C. to 850 degrees C. When the heating temperature is too low, the platinum group metals are not chloridized sufficiently. Therefore, the platinum and the palladium may not be chloridized, and the platinum and the palladium are not separated sufficiently in the next process of water leaching. When the heating temperature is too high, the generated chloride vaporizes and collecting rate is reduced. The chloridizing reactions of rhodium, platinum and palladium in the chloridizing process are shown as follows:

$$2Rh + 3Cl_2 \rightarrow 2RhCl_3$$

$$Pt + 2Cl_2 \rightarrow PtCl_4$$

$$2Pd + 3Cl_2 \rightarrow 2PdCl_3.$$

A large part of impurity of the raw material is chloridized in the chloridizing process. It is possible to separate a volatile component such as selenium chloride or tellurium chloride from the platinum group metal because the volatile component vaporizes. It is preferable that the temperature of these chlorides is kept at volatile temperature during temperature rising process and the volatile chlorides are vaporized and separated, when the material includes a lot of volatile component. It is possible to separate the selenium at approximately 200 degrees C. for an hour. It is possible to separate the tellurium at approximately 440 degrees C. for an hour.

An amount of chlorine gas for the chloridizing process is not limited particularly. An equivalent amount of the chlorine gas in the reaction plus an amount of the chlorine gas for maintaining the chlorine atmosphere in the furnace is needed at least. An excessive amount of chlorine is needed in view of the reaction of the impurity of the raw material and the chlorine gas. The chloridizing process time is not limited particularly, but is preferably 1 to 10 hours, and is more preferably 3 to 6 hours.

Next, the treated material is washed with water. The chlorides of platinum and palladium are dissolved. And, the solution is filtered. This results in residual of in soluble rhodium chloride in the residue. It is therefore possible to separate the rhodium from the platinum and the palladium. Water-soluble component such as copper chloride is dissolved into the solution together with the platinum and the palladium. Water-insoluble component such as chlorides of ruthenium and iridium are left in the residue together with the rhodium. The amount of water for water-washing is not particularly limited. However, it is preferable that the residue is water-washed sufficiently, because the separation is degraded when the solution is left as adhesive water. On the other hand, the collectivity of the platinum and the palladium is degraded when the concentration of the platinum and the palladium is reduced. It is therefore preferable that the solution is heated and is concentrated.

The temperature in the water-washing process is not particularly limited. The chlorides of platinum and palladium may be dissolved at normal temperature.

It is possible to collect the platinum and the palladium in the solution obtained by the water-washing with a known method. For example, "Development of Hydrometallurgical Process of Copper Anode Slimes in Nippon Mining & Metals" by Akinori TORAIWA and Yoshifumi ABE, JOURNAL OF THE MINING AND MATERIALS PROCESSING INSTITUTE OF JAPAN, vol. 116, pp. 484-492 (2000) discloses a method of collecting platinum and palladium from a solution including platinum group metal with a solvent extraction method. With the method, the platinum is extracted with TBP (tributyl phosphate), is back extracted and is refined. This results in crystallization of ammonium chloroplatinate, when ammonium chloride is added. The ammonium chloroplatinate is heated and degraded into platinum sponge. Palladium is extracted with di-n-hexyl sulfide (DHS), back-extracted liquid is neutralized with hydrochloric acid, and dichlorodiamminepalladium is crystallized. The dichlorodiamminepalladium is heated and degraded into palladium sponge.

Water-washed residue including rhodium is dried and crushed. Sodium chloride and carbon particle are added to the crushed residue, and are mixed sufficiently. This mixed matter is put into a silica container, is heated in a chlorine gas stream, and is subjected to a chloridizing roasting treatment. With the processes, soluble salt of rhodium is obtained. Preferable heating temperature is 700 degrees C. to 850 degrees C. More preferable heating temperature is 750 degrees C. to 830 degrees C. The treating time is not particularly limited, is preferably 1 to 10 hours, and is more preferably 3 to 6 hours.

A reaction of chloridizing and roasting rhodium into soluble salt $Na_3RhCl_6$ is shown as follows.

$$2RhCl_3 + 6NaCl \rightarrow 2Na_3RhCl_6$$

Chlorine gas is not contributed to the reaction. However, the rhodium chloride is dissociated into chlorine gas at 550 degrees C. or more. It is therefore necessary to maintain chlorine atmosphere. The chlorine gas restrains degradation of chloride. It is necessary to maintain chlorine atmosphere at 550 degrees C. or more at least. An amount of chlorine gas for chloridizing and roasting treatment is not particularly limited. However, an amount for maintaining the chlorine atmosphere is needed at least.

Here, ruthenium and iridium react with sodium chloride, and soluble salt is formed. A small amount of platinum and palladium not dissolved into the solution reacts with the sodium chloride, and soluble salt is formed.

An adding amount of sodium chloride is preferably 1 to 7 times as reaction equivalent amount of the reactions mentioned above. A rate of chloridized-vaporized treated material is reduced with respect to a total amount to be put into the furnace, when the adding amount of sodium chloride. This results in degradation of treatment efficiency. The adding amount is preferably 3 to 5 times. Platinum group metal such as ruthenium or iridium reacts with and uses sodium chloride. Therefore the platinum group metal may be considered in the adding amount of sodium chloride.

The adding amount of carbon particle may be a little, because the carbon particle has only to reduce an oxide layer formed in the drying process of the residue and remove oxygen in atmosphere gas.

The chloridizing-roasting treated material is water-leached, and dissolves the soluble salt of rhodium. The water-leaching condition is not particularly limited. It is however preferable that warm water of 50 to 90 degrees C. is used in order to facilitate leaching, because a part of the chloridizing and roasting treated material may be melted. Here, ruthenium, iridium and a small amount of platinum and palladium not dissolved into the solution are dissolved into water.

The residue including insoluble unreacted rhodium, carbon particle, and insoluble impurity is filtered and separated. Thus, a rhodium-leached liquid including impurity is obtained.

Ruthenium is separated and collected from the rhodium-leached liquid including impurity with an oxidizing and distilling method. Sodium bromated is added to the rhodium-leached liquid including impurity as an oxidant in a distilling device. And ruthenium is oxidized to ruthenium tetroxide. The ruthenium tetroxide is easy to be vaporized when the ruthenium tetroxide is heated to 70 to 95 degrees C., because a boiling temperature of the ruthenium tetroxide is approximately 130 degrees C. Therefore, air is blown into the ruthenium-leached liquid. The ruthenium tetroxide is introduced into the hydrochloric acid, and is converted into ruthenium chloride. Thus, ruthenium is collected.

It is possible to refine and collect rhodium from the solution including rhodium separated from ruthenium, with following methods.

(1) Copper, iron, lead and so on are extracted from the solution including rhodium with di-2-ethylhexyl phosphoric acid (D2EHPA).
(2) An oxidant such as sodium hypochlorite is added to the solution of process (1). The solution is heated. Iridium in the solution is oxidized to tetravalent. The solution is adjusted to hydrochloric acid solution. Iridium and platinum are extracted with TBP.
(3) Palladium is extracted from the solution of process (2) with DHS.
(4) Neutralized rhodium is obtained by neutralizing the solution (3) with sodium hydrate. The neutralized rhodium is water-washed, and sodium is removed. After that, rhodium is dissolved with hydrochloric acid.
(5) Ammonium chloride is added to the solution of process (4). And rhodium chloride ammonium is crystallized.
(6) Rhodium chloride ammonium is dissolved with pure water. Rhodium is reduced by added formic acid. Thus, rhodium black is obtained.
(7) Oxygen is removed by burning the rhodium black in hydrogen-argon mixed gas. Thus, rhodium sponge is obtained.

With the above-mentioned method, impurity amount of rhodium is reduced. Rhodium has 99.9 mass % or more grade.

EXAMPLES

First Example

A description will be given of examples. Selenium was distilled and collected from copper-electrolyzed deposition. Carbon particle of 450 g for reducing surface oxide layer and restraining oxidation was mixed with the selenium-distilled residue of 10 kg. The selenium-distilled residue had particle size of 500 μm or smaller. Therefore, the selenium-distilled residue was not crushed. Table 1 shows composition and contained amount of the selenium-distilled residue. Palladium amount and platinum amount were respectively 1.75 times and 1.4 times as rhodium amount included in the selenium-distilled residue.

TABLE 1

COMPOSITION AND CONTAINED AMOUNT OF SELENIUM-DISTILLED RESIDUE

|  | Rh | Ru | Pd | Pt | Se |
|---|---|---|---|---|---|
| GRADE (%) | 2.0 | 19.8 | 3.5 | 2.8 | 56.2 |
| CONTAINED AMOUNT (g) | 200 | 1,980 | 350 | 280 | 5,620 |

The mixed material was put into a silica boat. The silica boat had been housed in a tube furnace having silica core tube at 200 degrees C. and 440 degrees C. for one hour respectively with chlorine gas being flown after starting of temperature rising, and at 850 degrees C. for 5 hours. Thus, the mixed material was subjected to a chloridizing treatment.

The treated material was water-washed with pure water at room temperature, and filtered and separated with a vacuum filtration device. Thus, 12 L of water wash liquid including platinum and palladium was obtained. Table 2 shows composition, contained amount and leaching rate of the leach liquid. Platinum and palladium were dissolved into the water wash liquid. However, little rhodium, ruthenium and selenium were dissolved into the water wash liquid. pH after water washing was 1.2 indicating acidic property. This is because chloridized material trapped chlorine gas and hydrochloric acid was generated in the water wash liquid.

TABLE 2

COMPOSITION AND CONTAINED AMOUNT OF WATER WASHED LIQUID OF CHLORIDIZED MAT

|  | Rh | Ru | Pd | Pt | Se |
|---|---|---|---|---|---|
| LIQUID COMPOSITION (g/L) | <0.01 | 0.01 | 24.8 | 19.1 | <0.01 |
| CONTAINED AMOUNT (g) | 0 | 0 | 290 | 229 | 0 |
| DISTRIBUTION RATIO (%) | 0.0 | 0.0 | 85.0 | 81.9 | 0.0 |

Water wash residue had been dried in a drier of 100 degrees C. temperature for 12 hours. The residue had weight of 2,050 g after drying. The weight of the residue was largely reduced because chlorides of selenium and tellurium having high stream pressure were generated in the chloridizing process and were vaporized. Sodium chloride of 4.2 kg and carbon particle of 280 g were mixed with the residue. The mixed material was put into a silica boat. The silica boat had been housed in a tube furnace having silica core tube at 780 degrees C. for 3 hours with chlorine gas being flown. Thus, the mixed material was subjected to a chloridizing and roasting treatment.

The treated material was leached in a warm water of 80 degrees C., and filtered and separated with a vacuum filtrate device. Thus, rhodium-leached liquid including impurity of 27 L was obtained. Table 3 shows composition, contained amount, and distribution ratio of the leach liquid. Concentrations of palladium and platinum were 1/10 or smaller of that of rhodium.

The distribution ratio of rhodium was 93% with respect to the selenium-distilled residue. Therefore, approximately all amount of rhodium was water-leached. The distributions of rhodium and platinum were 1.5% and 4.1% respectively. It was therefore possible to easily separate rhodium from palladium and platinum of the raw material including rhodium, palladium and platinum.

On the other hand, the distribution ratio of ruthenium into the water leach liquid was 37% indicating low. This is because the temperature of the chloridizing process was high and ruthenium chloride was vaporized. Rhodium chloride was difficult to vaporize, compared to ruthenium chloride. Therefore, high distribution ratio was obtained.

TABLE 3

COMPOSITION AND CONTAINED AMOUNT OF WATER LEACH LIQUID OF CHLORIDIZED AND ROASTED MATERIAL

|  | Rh | Ru | Pd | Pt | Se |
|---|---|---|---|---|---|
| LIQUID COMPOSITION (g/L) | 6.9 | 26.8 | 0.19 | 0.43 | <0.01 |
| CONTAINED AMOUNT (g) | 186 | 724 | 5 | 12 | 0 |
| DISTRIBUTION RATIO (%) | 93.2 | 36.5 | 1.5 | 4.1 | 0.0 |

As shown in Table 3, the water leach liquid included a lot of ruthenium. Sodium bromated acting as oxidant was added to the water leach liquid. The water leach liquid had been subjected to distilling treatment at 80 degrees C. for 2 hours. And ruthenium was removed. Rhodium was refined with solvent extraction method or the like and was collected as rhodium black by reducing with formic acid, because a little impurity such as platinum and palladium was included. The rhodium black was roasted in 5% hydrogen-argon gas because the rhodium black included a lot of oxygen. Thus, rhodium was obtained. The metal component was measured with glow-discharge mass spectrometry (GDMS) method. Oxygen content was measured with an oxygen analyzer made by LECO co. Thus, the grade of the rhodium particle was measured. Table 4 shows the measured result of rhodium. The collected rhodium included a little impurity. The grade of the rhodium was 99.9 mass % or more.

TABLE 4

COMPOSITION OF RHODIUM COLLECTED FROM SELENIUM-DISTILLED RESIDUE (mass ppm)

| Ru | Pd | Pt | Ir | Os | Se | Cu | Fe | Cr | Ni | O |
|---|---|---|---|---|---|---|---|---|---|---|
| <1 | 2 | 86 | 8 | <1 | <1 | 4 | 1 | 1 | <1 | 80 |

Second Example

In a second example, a raw material was rhodium-treated slag by treating scrap such as automotive exhaust catalyst including platinum group metal such as rhodium, platinum or palladium. The rhodium-treated slag was crushed with a hammer mill and was filtered with a mesh of 500 μm opening. Thus particle sample was obtained. Table 5 shows composition and contained amount of the crushed rhodium-treated slag. Palladium amount and platinum amount were 2.6 times and 1.7 times respectively as rhodium amount in the rhodium-treated slag.

TABLE 5

COMPOSITION AND CONTAINED AMOUNT OF RHODIUM-TREATED SLAG

|  | Rh | Ru | Pd | Pt | Ir | Cu |
|---|---|---|---|---|---|---|
| GRADE (%) | 8.68 | 0.58 | 22.5 | 14.7 | 0.87 | 2.01 |
| CONTAINED AMOUNT (g) | 7.8 | 0.5 | 20.3 | 13.2 | 0.8 | 1.8 |

Carbon particle of 22 g was mixed to the crushed rhodium-treated slag of 90 g in order to reduce a surface oxide layer and restrain oxidation.

The mixed material was put into a silica beaker having 200 ml content. The silica beaker had been housed in a tube furnace having silica core tube at 200 degrees C. and 440 degrees C. for one hour respectively with chlorine gas being flown after starting of temperature rising, and at 780 degrees C. for 3 hours. Thus, the mixed material was subjected to a chloridizing treatment.

The treated material was water-washed with pure water at room temperature, and was filtered and separated with a vacuum filtration device. Thus, 1.2 L of water wash liquid including platinum and palladium was obtained. Table 6 shows composition, contained amount and leaching rate of the leach liquid. Platinum, palladium and copper were dissolved into the water wash liquid. However, little rhodium, ruthenium and iridium were dissolved into the water wash liquid. pH after water washing was 1.4 indicating acidic property.

TABLE 6

|  | Rh | Ru | Pd | Pt | Ir | Cu |
|---|---|---|---|---|---|---|
| LIQUID COMPOSITION (g/L) | 0.05 | 0.01 | 14.1 | 9.1 | 0.04 | 0.99 |
| CONTAINED AMOUNT (g) | 0.1 | 0.0 | 16.9 | 10.9 | 0.0 | 1.2 |
| DISTRIBUTION RATIO (%) | 0.8 | 2.3 | 83.6 | 82.5 | 6.1 | 65.7 |

Water wash residue was dried with the same method as the first example. Sodium chloride of 148 g and carbon particle of 3.5 g were mixed with the residue. And the residue was subjected to a chrolidizing and roasting treatment. The mixed material was put into a silica beaker. The silica beaker had been housed in a tube furnace having silica core tube at 780 degrees C. for 3 hours with chlorine gas being flown. Thus, the mixed material was subjected to a chloridizing and roasting treatment.

The treated material was leached in a warm water of 80 degrees C., and filtered and separated with a vacuum filtrate device. Thus, rhodium-leached liquid including impurity of 0.55 L was obtained. Table 7 shows composition, contained amount, and distribution ratio of the leach liquid. Concentrations of palladium and platinum were 1/19 and 1/29 of that of rhodium respectively.

The distribution ratio of rhodium with respect to the rhodium-treated slag was 95%. Therefore, approximately all amount of rhodium was water-leached. The distribution ratios of palladium and platinum were 2.0% and 1.9% respectively. It was therefore possible to easily separate rhodium from palladium and platinum in the raw material including rhodium, palladium and platinum.

TABLE 7

|  | Rh | Ru | Pd | Pt | Ir | Cu |
|---|---|---|---|---|---|---|
| LIQUID COMPOSITION (g/L) | 13.5 | 0.70 | 0.71 | 0.47 | 1.1 | 0.05 |
| CONTAINED AMOUNT (g) | 7.4 | 0.4 | 0.4 | 0.3 | 0.6 | 0.0 |
| DISTRIBUTION RATIO (%) | 95.0 | 73.8 | 1.9 | 2.0 | 77.3 | 1.5 |

Ruthenium was distilled and separated from the water leach liquid with the same method as the first example. After that, rhodium was refined with a solvent extraction method or the like. Rhodium was obtained by reducing with formic acid and roasting. Table 8 shows the measured result of rhodium.

The collected rhodium included a little impurity. The grade of the rhodium was 99.9 mass % or more.

TABLE 8

COMPOSITION OF RHODIUM COLLECTED FROM RHODIUM-TREATED SLAG (mass ppm)

| Ru | Pd | Pt  | Ir | Os | Se | Cu | Fe | Cr | Ni | O   |
|----|----|-----|----|----|----|----|----|----|----|-----|
| 7  | 1  | 110 | 2  | <1 | 3  | 37 | 2  | 1  | 1  | 230 |

Third Example

In a third example, crushed rhodium-treated slag of 90 g obtained with the same treatment of the second example had been subjected to the chloridizing treatment at 850 degrees C. for 5 hours. The other chloridizing treatment was the same as the second example.

The treated material was water-washed with pure water at room temperature, and was filtered and separated with a vacuum filtration device. Thus, 1.3 L of water wash liquid including platinum and palladium was obtained. Table 9 shows composition, contained amount and leaching rate of the leach liquid. Platinum, palladium and copper were dissolved into the water wash liquid. However, little rhodium, ruthenium and iridium were dissolved into the water wash liquid. pH after water-washing was 1.5 indicating acidic property.

TABLE 9

COMPOSITION AND CONTAINED AMOUNT OF WATER-WASHED LIQUID OF CHLORIDIZED MATERIAL

|  | Rh | Ru | Pd | Pt | Ir | Cu |
|---|---|---|---|---|---|---|
| LIQUID COMPOSITION (g/L) | 0.04 | 0.01 | 11.3 | 8.1 | 0.02 | 0.31 |
| CONTAINED AMOUNT (g) | 0.1 | 0.0 | 14.7 | 10.5 | 0.0 | 0.4 |
| DISTRIBUTION RATIO (%) | 0.7 | 2.5 | 72.5 | 79.6 | 3.3 | 22.3 |

Water-washed residue was subjected to a chlodizing and roasting treatment with the same method and the same condition as the second example. The treated material was leached in a warm water of 80 degrees C., and filtered and separated with a vacuum filtrate device. Thus, rhodium-leached liquid including impurity of 0.52 L was obtained. Table 10 shows composition, contained amount, and distribution ratio of the leach liquid. Concentrations of palladium and platinum in the leach liquid were 1/20 and 1/35 of that of rhodium respectively.

The distribution ratio of rhodium with respect to the rhodium-treated slag was 92%. Therefore, approximately all amount of rhodium was water-leached. The distribution ratios of palladium and platinum were 1.8% and 1.6% respectively. It was therefore possible to easily separate rhodium from palladium and platinum of the raw material including rhodium, palladium and platinum. On the other hand, the distribution ratio of ruthenium into the water leach liquid was 43% indicating low. This is because the temperature of the chloridizing process was high and ruthenium chloride was vaporized. Rhodium chloride was difficult to vaporize, compared to ruthenium chloride. Therefore, high distribution ratio was obtained.

TABLE 10

COMPOSITION AND CONTAINED AMOUNT OF WATER LEACH LIQUID OF CHLORIDIZED AND ROASTED MATERIAL

|  | Rh | Ru | Pd | Pt | Ir | Cu |
|---|---|---|---|---|---|---|
| LIQUID COMPOSITION (g/L) | 13.8 | 0.43 | 0.69 | 0.40 | 0.96 | 0.05 |
| CONTAINED AMOUNT (g) | 7.2 | 0.2 | 0.4 | 0.2 | 0.5 | 0.0 |
| DISTRIBUTION RATIO (%) | 91.9 | 42.8 | 1.8 | 1.6 | 63.8 | 1.4 |

Ruthenium was distilled and separated from the water leach liquid with the same method as the first example. After that, rhodium was refined with a solvent extraction method or the like. Rhodium was obtained by reducing with formic acid and roasting. Table 11 shows the measured result of rhodium. The collected rhodium included a little impurity. The grade of the rhodium was 99.9 mass % or more.

TABLE 11

COMPOSITION OF RHODIUM COLLECTED FROM RHODIUM-TREATED SLAG (mass ppm)

| Ru | Pd | Pt | Ir | Os | Se | Cu | Fe | Cr | Ni | O   |
|----|----|----|----|----|----|----|----|----|----|-----|
| 1  | <1 | 90 | 13 | <1 | <1 | 2  | <1 | 1  | <1 | 180 |

First Comparative Example

A description will be given of comparative examples. In a first comparative example, the rhodium-treated slag shown in Table 5 of the second example was not crushed. Carbon particle was mixed to the rhodium-treated slag. The other chloridizing treatment was the same as the second example. The rhodium-treated slag before crushing was granulated powder having a particle diameter of 0.2 mm to 2 mm.

The treated matter was water-washed with pure water at room temperature, and was filtered and separated with a vacuum filtration device. Thus, water wash liquid including platinum and palladium of 1.4 L was obtained. The collected material on a paper filter was dried. Thus, water-washed residue of 69.5 g was obtained. Table 12 shows composition, contained amount, and distribution ratio of the water wash liquid. Table 13 shows composition, contained amount, and distribution ratio of the water-washed residue. Palladium, platinum and copper were dissolved into the water wash liquid. The distribution ratios of palladium, platinum and copper were 29%, 16%, and 40% respectively indicating low. Palladium and platinum were left in the water-washed residue. Therefore, rhodium was not separated from palladium and platinum sufficiently. Configuration of the water-washed residue was measured with an X-ray diffraction. As a result, palladium and platinum were left as metal. It was therefore confirmed that internal portion of particle was not chloridized because the particle size was large.

TABLE 12

COMPOSITION AND CONTAINED AMOUNT OF WATER WASH LIQUID OF CHLORIDIZED MATERIAL

|  | Rh | Ru | Pd | Pt | Ir | Cu |
|---|---|---|---|---|---|---|
| LIQUID COMPOSITION (g/L) | 0.04 | <0.01 | 4.2 | 1.5 | 0.01 | 0.51 |
| CONTAINED AMOUNT (g) | 0.1 | 0.0 | 5.9 | 2.1 | 0.0 | 0.7 |
| DISTRIBUTION RATIO (%) | 0.7 | 0.0 | 29.0 | 15.7 | 2.0 | 39.5 |

TABLE 13

COMPOSITION AND COMTAINED AMOUNT OF WATED WASH RESIDUE OF RHODIUM-TREATED SLAG

|  | Rh | Ru | Pd | Pt | Ir | Cu |
|---|---|---|---|---|---|---|
| GRADE (%) | 11.0 | 0.61 | 19.8 | 15.9 | 1.09 | 1.18 |
| CONTAINED AMOUNT (g) | 7.6 | 0.4 | 13.8 | 11.1 | 0.8 | 0.8 |
| DISTRIBUTION RATIO (%) | 97.9 | 81.2 | 68.0 | 83.5 | 96.7 | 45.3 |

Second Comparative Example

In a second comparative example, the rhodium-treated slag shown in Table 5 of the second example was crushed. The carbon particle was not mixed to the particle sample filtered with the filter having an opening of 500 μm. The other chloridizing treatment was the same as the second example.

The treated matter was water-washed with pure water at room temperature, and was filtered and separated with a vacuum filtration device. Thus, water wash liquid including platinum and palladium of 1.3 L was obtained. The collected material on a paper filter was dried. Thus, water-washed residue of 54.9 g was obtained. Table 14 shows composition, contained amount, and distribution ratio of the water wash liquid. Table 15 shows composition, contained amount, and distribution ratio of the water-washed residue. Palladium, platinum and copper were dissolved into the water wash liquid. The distribution ratios of palladium, platinum and copper were 46%, 33%, and 55% respectively indicating low. Palladium and platinum were left in the water-washed residue. Therefore, rhodium was not separated from palladium and platinum sufficiently. Configuration of the water-washed residue was measured with an X-ray diffraction. As a result, palladium and platinum were left as oxide. It was therefore confirmed that internal portion of particle was not chloridized because there was surface oxide layer.

TABLE 14

COMPOSITION AND CONTAINED AMOUNT OF WATER WASH LIQUID OF CHLORIDIZED MATERIAL

|  | Rh | Ru | Pd | Pt | Ir | Cu |
|---|---|---|---|---|---|---|
| LIQUID COMPOSITION (g/L) | 0.12 | <0.01 | 7.2 | 3.3 | 0.01 | 0.77 |
| CONTAINED AMOUNT (g) | 0.2 | 0.0 | 9.4 | 4.3 | 0.0 | 1.0 |
| DISTRIBUTION RATIO (%) | 2.0 | 0.0 | 46.2 | 32.5 | 1.8 | 55.3 |

TABLE 15

COMPOSITION AND COMTAINED AMOUNT OF WATED-WASHED RESIDUE OF RHODIUM-TREATED SLAG

|  | Rh | Ru | Pd | Pt | Ir | Cu |
|---|---|---|---|---|---|---|
| GRADE (%) | 13.9 | 0.83 | 16.2 | 15.6 | 1.40 | 1.05 |
| CONTAINED AMOUNT (g) | 7.6 | 0.5 | 8.9 | 8.6 | 0.8 | 0.6 |
| DISTRIBUTION RATIO (%) | 97.7 | 87.3 | 43.9 | 64.7 | 98.2 | 31.9 |

Third Comparative Example

In a third comparative example, the rhodium-treated slag shown in Table 5 was chloridized at 700 degrees C. The other chloridizing treatment was the same as the second example.

The treated matter was water-washed with pure water at room temperature, and was filtered and separated with a vacuum filtration device. Thus, water wash liquid including platinum and palladium of 1.2 L was obtained. The collected material on a paper filter was dried. Thus, water-washed residue of 52.9 g was obtained. Table 16 shows composition, contained amount, and distribution ratio of the water wash liquid. Table 17 shows composition, contained amount, and distribution ratio of the water-washed residue. Palladium and platinum were dissolved into the water wash liquid. The distribution ratios of palladium and platinum were 49% and 28% respectively indicating low. Palladium and platinum were left in the water-washed residue. Therefore, rhodium was not separated from palladium and platinum sufficiently. Configuration of the water-washed residue was measured with an X-ray diffraction. As a result, palladium and platinum were left as metal. It was therefore confirmed that internal portion of particle was not chloridized because the chloridizing temperature was low.

TABLE 16

COMPOSITION AND CONTAINED AMOUNT OF WATER WASH LIQUID OF CHLORIDIZED MATERIAL

|  | Rh | Ru | Pd | Pt | Ir | Cu |
|---|---|---|---|---|---|---|
| LIQUID COMPOSITION (g/L) | 0.13 | 0.01 | 8.3 | 3.1 | 0.01 | 0.98 |
| CONTAINED AMOUNT (g) | 0.2 | 0.0 | 10.0 | 3.7 | 0.0 | 1.2 |
| DISTRIBUTION RATIO (%) | 2.0 | 2.3 | 49.2 | 28.1 | 1.5 | 65.0 |

TABLE 17

COMPOSITION AND COMTAINED AMOUNT OF WATED-WASHED RESIDUE OF RHODIUM-TREATED SLAG

|  | Rh | Ru | Pd | Pt | Ir | Cu |
|---|---|---|---|---|---|---|
| GRADE (%) | 14.5 | 0.93 | 17.3 | 16.9 | 1.44 | 0.91 |
| CONTAINED AMOUNT (g) | 7.7 | 0.5 | 9.2 | 8.9 | 0.8 | 0.5 |
| DISTRIBUTION RATIO (%) | 98.2 | 94.2 | 45.2 | 67.6 | 97.3 | 26.6 |

Fourth Comparative Example

In a fourth comparative example, the rhodium-treated slag shown in Table 5 was chloridized at 900 degrees C. The other chloridizing treatment was the same as the second example.

The treated matter was water-washed with pure water at room temperature, and was filtered and separated with a vacuum filtration device. Thus, water wash liquid including platinum and palladium of 1.3 L was obtained. The collected material on a paper filter was dried. Thus, water-washed residue of 45.0 g was obtained. Table 18 shows composition, contained amount, and distribution ratio of the water wash liquid. Table 19 shows composition, contained amount, and distribution ratio of the water-washed residue. Palladium and platinum were dissolved into the water wash liquid. The distribution ratios of palladium and platinum were 66% and 67% respectively. Concentrations of palladium and platinum in the water-washed residue were 5% or smaller indicating low. Therefore, palladium and platinum were separated from rhodium sufficiently. On the other hand, rhodium was hardly dissolved into the water wash liquid. And the distribution ratio of rhodium into the water-washed residue was 67% indicating low. This is because the speed of the chloridizing treatment was high and rhodium chloride was vaporized in the chloridizing treatment. And the collecting rate of rhodium was lowered.

TABLE 18

COMPOSITION AND CONTAINED AMOUNT OF WATER WASH LIQUID OF CHLORIDIZED MATERIAL

|  | Rh | Ru | Pd | Pt | Ir | Cu |
|---|---|---|---|---|---|---|
| LIQUID COMPOSITION (g/L) | 0.12 | 0.01 | 10.2 | 6.8 | 0.01 | 0.66 |
| CONTAINED AMOUNT (g) | 0.2 | 0.0 | 13.3 | 8.8 | 0.0 | 0.9 |
| DISTRIBUTION RATIO (%) | 2.0 | 2.5 | 65.5 | 66.8 | 1.7 | 47.4 |

TABLE 19

COMPOSITION AND COMTAINED AMOUNT OF WATED-WASHED RESIDUE OF RHODIUM-TREATED SLAG

|  | Rh | Ru | Pd | Pt | Ir | Cu |
|---|---|---|---|---|---|---|
| GRADE (%) | 11.7 | 0.33 | 2.2 | 1.3 | 0.95 | 0.08 |
| CONTAINED AMOUNT (g) | 5.3 | 0.1 | 1.0 | 0.6 | 0.4 | 0.0 |
| DISTRIBUTION RATIO (%) | 67.4 | 28.4 | 4.9 | 4.4 | 54.6 | 2.0 |

The present invention is not limited to the specifically disclosed embodiments, but include other embodiments and variations without departing from the scope of the present invention.

The present application is based on Japanese Patent Application No. 2008-249448 filed on Sep. 29, 2008, the entire disclosure of which is hereby incorporated by reference.

What is claimed is:

1. A method of separating rhodium from platinum and/or palladium comprising:
   chloridizing a raw material including rhodium and at least platinum and/or palladium in chlorine atmosphere without sodium chloride and obtaining a soluble salt of platinum and/or palladium;
   water-leaching chloridized material and dissolving platinum and/or palladium into a solution;
   filtering the solution; and
   leaving rhodium in a filtered residue of the solution.

2. The method as claimed in claim 1 further comprising:
   crushing the raw material including rhodium and at least platinum and/or palladium into particles having grain diameter of 500 μm or smaller; and
   mixing carbon particle with the crushed raw material.

3. The method as claimed in claim 1, wherein the raw material is chloridized at 750 to 880 degrees C.

4. The method as claimed in claim 1 wherein the raw material includes ruthenium and iridium, further comprising:
   mixing sodium chloride with the residue;
   chloridizing the residue in chlorine atmosphere and obtaining a soluble salt of rhodium, ruthenium, and iridium;
   water-leaching the rhodium, ruthenium, and iridium and dissolving the rhodium, ruthenium, and iridium into a solution;
   filtering the solution;
   adding sodium bromate to the solution and separating ruthenium from the solution by oxidizing and distilling; and
   separating palladium, platinum, and iridium in order with solvent extraction method.

* * * * *